June 6, 1939. H. N. FAIRBANKS 2,161,341
LOCKING DEVICE FOR CORES IN FILM MAGAZINES
Filed Jan. 19, 1938

Henry N. Fairbanks
INVENTOR

BY
ATTORNEYS

Patented June 6, 1939

2,161,341

UNITED STATES PATENT OFFICE 2,161,341

LOCKING DEVICE FOR CORES IN FILM MAGAZINES

Henry N. Fairbanks, Rochester, N. Y., assignor to Eastman Kodak Company, Rochester, N. Y., a corporation of New Jersey Application January 19, 1938, Serial No. 185,707

8 Claims. (Cl. 242—71)

The present invention relates to an improved arrangement for locking the film core in a film magazine against rotation during transportation of the magazine and for automatically releasing the film core when the magazine is inserted into its associated apparatus. This invention constitutes an improvement over that disclosed in my U. S. Patent No. 2,051,206, issued August 18, 1936, both from the standpoint of structural design and of ease and reliability in operation.

Many types of locking device for magazine film cores are known to the prior art. Some of such locking devices act continually upon the film core to provide a friction drag during operation of the magazine as well as during its removal from the apparatus. Others of such locking devices are automatically released when the magazine is inserted into the apparatus or when the control release is actuated for operation of said apparatus. The primary object of the present invention is the provision of a locking device to prevent rotation of a film roll within a film magazine, and which includes a resilient member within the support for the film core for engaging the film core to prevent rotation thereof and adapted upon relative axial movement with respect to the support member to be disengaged from said film core.

Another object of the invention is the provision in such a locking device of a resilient member inserted into a hollow support member and extending through an opening thereof to engage the film core, said resilient member being disengaged either by co-operation of a bent portion thereof with an opening in the hollow support member or by engagement of its end with an inclined surface within said hollow support member, or both.

A further object of the invention is the combination of the improved locking device according to the invention with a motion picture apparatus of the magazine type whereupon a protuberance in the magazine chamber of the apparatus enters the hollow support member and causes axial movement of the resilient member to disengage it from the film core.

Other and further objects of the invention will be apparent to those skilled in the art from the following disclosure.

The above and other objects of the invention are embodied in a locking device for preventing rotation of a film magazine, which locking device comprises in combination a hollow support member provided with an opening, a core rotatably mounted on the support member and adapted to receive a film coil, a resilient member mounted for axial movement within the support member and having a portion normally engaging the film core to prevent rotation thereof, and co-operating surfaces on the support member and on the resilient member which are arranged so that upon relative axial movement between said support member and said resilient member the latter is disengaged from the film core. Specifically, such a locking device is particularly suited to a film magazine adapted for lateral insertion into a motion picture apparatus containing a protuberance which is adapted upon insertion of the magazine to extend into the hollow support member and axially move said resilient member.

Reference is hereby made to the accompanying drawing wherein similar reference characters designate similar elements and wherein.

Figure 1:
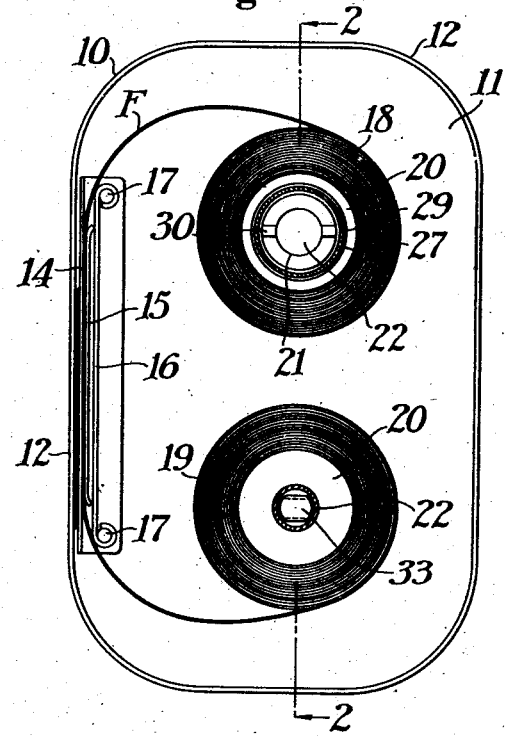
Fig. 1 is a side elevation of a film magazine equipped with a locking device of the invention.
Figure 2:
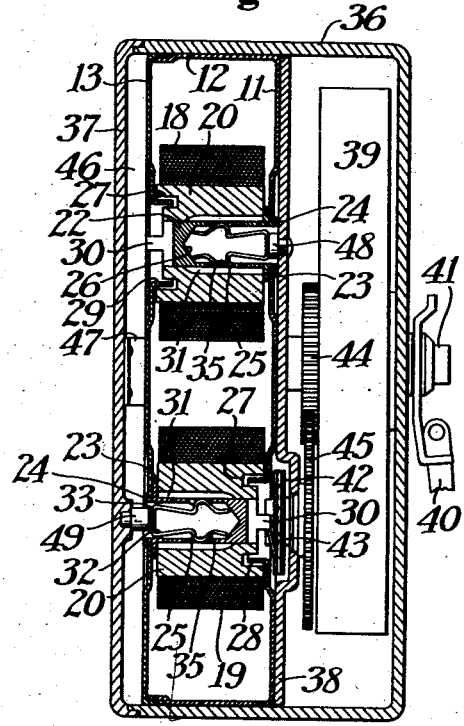
Fig. 2 is a section through a motion picture camera of the magazine type and through the film magazine taken on the line 2—2 of Fig. 1 and illustrating the operation of the resilient members by the protuberances in the magazine chamber when the film magazine is inserted thereinto.

Although the locking device of the invention has been illustrated with respect to a film magazine associated with a motion picture camera, it is to be understood that the invention may be applied with equal advantages to other motion picture apparatus of the magazine type. Furthermore, the film rolls have been illustrated herein as being wound on film cores but it is to be understood that my invention also encompasses a locking device for engaging the core or hub member of a spool to prevent rotation thereof under the conditions set forth.

Referring now to the illustrated embodiment of my invention, the film magazine comprises a magazine casing 10 having a side wall 11 and a lateral edge wall 12. A cover 13 engages said lateral edge wall 12 to enclose the casing 10. The film magazine is provided in conventional fashion with a film gate including a front gate member 14 which is attached to the side wall 11 and including a pressure member 15 which is resiliently urged toward the front gate member 14 by a spring 16 mounted between posts 17 which are secured to the side wall 11. The film F is provided in the regular way in a supply film roll 18 from which said film F extends between gate members 14 and 15 to the take-up film roll 19.

Both of the film rolls are wound upon film cores 20. Each film core is preferably cylindrical, is provided with an axial hole 21 which fits a support member or spindle 22 fastened to the side wall 11 or cover 13 of the film magazine.

The support member or spindle 22 for the supply film roll 18 is fastened to the side wall 11 by a collar 23 and a riveted flange 24 on opposite sides of said wall 11. The support or spindle 22 for the take-up film roll is fastened in the same manner to the cover 13.

The support members or spindles 22 are each provided with a pair of opposed lateral openings 25 and each have a pair of inclined surfaces 26 at the closed end of said spindle 22.

Since the invention is illustrated with respect to a reversible film magazine, the support members 22 for the respective film rolls are mounted on opposite sides of the magazine casing, the support members and film cores being respectively inverted with respect to each other. Nevertheless, it should be clearly understood that the invention is not confined in its application to a reversible film magazine but may be utilized in all forms of film magazine.

Each of the film cores 20 are provided with an annular groove 27 in one end thereof and which receives an inturned flange 28 formed inwardly from the side wall 11 or a flange 29 formed inwardly from the cover 13. Engaging teeth 30 are also provided on the same end of the film cores 20 to extend through the openings provided respectively by the inturned flanges 28 and 29. The film cores 20 are also each provided with a pair of opposed longitudinal slots 31.

A resilient member is mounted for axial movement within the hollow support member 22 and may comprise a U-shaped spring member 32 having a central portion 33 and a pair of legs 34, each leg 34 being provided with a bent portion 35 which presents an inclined surface along one side and a more abrupt surface along the other side. Said spring member 32, when inserted within the spindle 22, normally urges said bent portions 35 through the lateral openings 25 of the spindles 22 into engagement with the longitudinal slots 31 on the interior of the film cores 20. Under this condition it is clear that the film cores 20 are positively locked against rotation and to prevent the natural resiliency of the film in film rolls 18 and 19 from unwinding or clock springing.

The arrangement for automatically disengaging said resilient members or spring members 32 from the film cores will now be described. The motion picture apparatus may comprise a camera housing 36 closed by a cover 37 and including a mechanism plate 38. The spring motor 39 is mounted in a known manner between mechanism plate 38 and a wall of camera housing 36 and may be wound by a crank 40 and winding spindle 41. A take-up clutch member 42 is rotatably mounted within a recess in mechanism plate 38, includes spring fingers 43 for engaging the teeth 30 of the film core 20 of the take-up film roll and is frictionally driven from the spring motor 39 by a gear train including gears 44 and 45. Said mechanism plate 38 also partitions the interior of camera housing 36 to provide a magazine chamber 46. A spring 47 is fastened to the camera cover 37 for bearing against the film magazine and holding it in proper position within said magazine chamber 46.

A protuberance 48 is mounted upon the mechanism plate 38 and is located opposite the hollow spindle 22 for the supply film roll 18 while a protuberance 49 is mounted on the camera cover 37 opposite the hollow spindle 22 for the take-up film roll 19.

Figures 3, 4, 6:
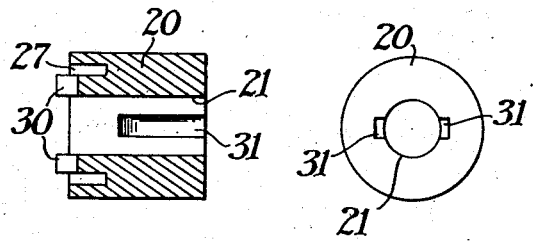
Fig. 3 is a longitudinal section of the film core.
Fig. 4 is an end view of one end of the film core.
Fig. 6 is a section through the film core and support member showing the locking device of the invention in locking position.
Figure 5:
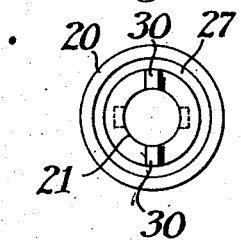
Fig. 5 is an end view of the other end of the film core.
Figure 7:
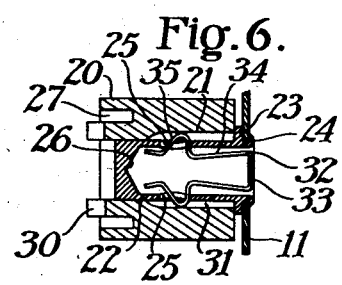
Fig. 7 is a perspective view of the resilient member of the locking device.

The operation of the locking device of the invention will now be described. When the film magazine is not associated with the motion picture apparatus, the resilient members of the locking device are in the normal position or the position illustrated in Fig. 6. The bent portions 35 in each leg 34 of the spring member 32 extend through the lateral openings 25 of the hollow spindle 22 and into the longitudinal slots 31 of the film cores 20. This inter-engagement between said bent portions 35 and slots 31 prevents rotation of the film cores 20 and the supply and take-up film rolls 18 and 19 with respect to the magazine casing 10. At the same time the central portion 33 of each spring member 32 is substantially flush with the open end of hollow spindles 22 and thus prevents the entry of dust, dirt or light into the magazine. It will also be noted that the magazine assembly is quite free of any projecting parts so that several magazines may be readily stacked, one upon the other.

When the film magazine is inserted into the magazine chamber 46 and the camera cover 37 is closed, protuberance 48 engages the central portion 33 of the spring member 32 within the hollow spindle 22 for the supply film roll 18 and the protuberance 49 engages the central portion 33 of the spring member 32 within the hollow spindle 22 for the take-up film roll 19. Such engagement of protuberances 48 and 49 with the respective spring members 32 moves said spring members axially with respect to the corresponding hollow spindle 22. This axial movement of said spring members 32 within the spindles 22 either causes the inclined sides of the bent portions 35 to slide along the edges of the lateral openings 25 in spindles 22 and retracts said bent portions 35 from the longitudinal slots 31 of film cores 20 or the inclined surfaces 26 at the closed end of spindles 22 engage the inner ends of spring members 32 also to cause retraction of bent portions 35 from longitudinal slots 31. It is obvious that either camming action is sufficient for dis-engagement of the spring member 32 from the film cores 20. However, the inclined surfaces 26 also act normally to return the spring members 32 to their normal position and insure that said spring members 32 will always be returned to such normal position in spite of their being axially displaced to such an extent that the summits of bent portions 35 engage the inner wall of the hollow spindles 22.

It should be noted that upon such dis-engagement of the spring members 32 the film cores 20 are quite free to rotate upon the spindles 22 and such rotation is in no way hampered by the locking device.

Since many variations of the present invention will occur to those skilled in the art, said invention is not to be limited by the embodiment illustrated herein but is only to be limited by the scope of the claims which follow.

Having now particularly described my invention, what I desire to secure by Letters Patent of the United States and what I claim is:

1. In a device to prevent rotation of a film roll within a film magazine, the combination with a magazine casing, a hollow support member therein and provided with an opening, and a core rotatably mounted on said support member and for receiving a film roll, of a resilient member mounted for axial movement within said support member and having a portion normally extending through the opening therein to engage said core and prevent rotation of said film roll, and co-operating surfaces on said support member and said resilient member arranged and adapted, upon relative axial movement therebetween, to remove said resilient member from engagement with said core.

2. In a device to prevent rotation of a film roll within a film magazine, the combination with a magazine casing, a hollow support member therein and provided with an opening, and a core rotatably mounted on said support member and for receiving a film roll, of a resilient member mounted for axial movement within said support member and having a portion normally extending through the opening therein to engage said core and prevent rotation of said film roll, and an inclined surface on one of said members arranged and adapted, upon relative axial movement between said members, to retract the portion of said resilient member from engagement with said core.

3. In a device to prevent rotation of a film roll within a film magazine, the combination with a magazine casing, a hollow support member therein and provided with an opening, and a core rotatably mounted on said support member and for receiving a film roll, of a resilient member mounted for axial movement within said support member and having a bent portion normally extending through the opening therein to engage said core, the opening in said support member and the bent portion of said resilient member being so arranged that axial movement of said resilient member moves said bent portion against the edge of said opening and retracts said bent portion from engagement with said core.

4. In a device to prevent rotation of a film roll within a film magazine, the combination with a magazine casing, a hollow support member therein and provided with an opening, and a core rotatably mounted on said support member and for receiving a film roll, of a resilient member mounted for axial movement within said support member and having a portion extending through the opening therein to engage said film core and having a portion enclosing the open end of said hollow support member, and co-operating surfaces on said support member and said resilient member arranged and adapted, upon relative axial movement therebetween, to remove said resilient member from engagement with said core.

5. In a device to prevent rotation of a film roll within a film magazine, the combination with a magazine casing, a hollow support member in said casing, having an internal inclined surface and provided with an opening, and a core rotatably mounted on said support member and for receiving a film roll, of a resilient member mounted for axial movement within said support member, having one portion normally extending through the opening therein to engage said core and having another portion located to engage the inclined surface in said support member upon axial movement of said resilient member therein and for retracting the first mentioned portion from engagement with said core.

6. In a device to prevent rotation of a film roll within a film magazine, the combination with a magazine casing, a hollow support member therein, having an internal inclined surface and provided with an opening, and a film core rotatably mounted on said support member, of a resilient member mounted for axial movement within said support member, having a bent portion normally extending through the opening in said support to engage said core, and having an end portion located resiliently to engage the inclined surface of said support member after said axial movement therein, said bent portion being retracted by axial movement of said resilient member within said support member and the resilient engagement of said end portion with said inclined surface reacting to return said resilient member to normal position.

7. In a device to prevent rotation of a film roll within a film magazine, the combination with a magazine casing, a hollow support therein provided with a pair of holes oppositely disposed, and a film core provided with an axial bore and a pair of internal opposed slots and rotatably mounted on said support, of a U-shaped spring member within said support and having a pair of legs each including a bent portion for extending through the holes in said support to engage the slots in said core and each adapted, upon axial movement of said spring member, to engage the edges of said holes and be retracted from engagement with said slots.

8. In a motion picture apparatus of the magazine type, the combination with a housing provided with a magazine chamber, and a protuberance in said housing and extending into said magazine chamber, of a film magazine casing adapted to be inserted into said chamber and including a hollow spindle provided with an opening and located to receive said protuberance when said casing is inserted into said housing, a film core rotatably mounted on said spindle, a spring member mounted for axial movement within said spindle and having a portion normally extending through said opening to engage said core, and co-operating surfaces on said spindle and said spring member operative, upon relative axial movement of said spring member by said protuberance upon insertion of the film magazine casing into said chamber, to remove the portion of said spring member from engagement with said film core.

HENRY N. FAIRBANKS.

Disclaimer 2,161,341.—*Henry N. Fairbanks*, Rochester, N. Y. LOCKING DEVICE FOR CORES IN FILM MAGAZINES. Patent dated June 6, 1939. Disclaimer filed Feb. 24, 1949, by the assignee, *Eastman Kodak Company*.

Hereby enters this disclaimer to claim 8 of said patent.

[*Official Gazette March 29, 1949.*]